(12) United States Patent
Aravkin et al.

(10) Patent No.: US 10,839,312 B2
(45) Date of Patent: Nov. 17, 2020

(54) WARNING FILTER BASED ON MACHINE LEARNING

(71) Applicant: International Business Machines Corporation, Armonk, NY (US)

(72) Inventors: Aleksandr Y. Aravkin, Seattle, WA (US); Salvatore Angelo Guarnieri, New York, NY (US); Marco Pistoia, Amawalk, NY (US); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 807 days.

(21) Appl. No.: 15/232,244

(22) Filed: Aug. 9, 2016

(65) Prior Publication Data

US 2018/0046934 A1 Feb. 15, 2018

(51) Int. Cl.
*G06N 20/00* (2019.01)
*G06F 21/56* (2013.01)
*G06F 21/57* (2013.01)

(52) U.S. Cl.
CPC .......... *G06N 20/00* (2019.01); *G06F 21/562* (2013.01); *G06F 21/577* (2013.01); *G06F 2221/033* (2013.01)

(58) Field of Classification Search
CPC ...... G06N 20/00; G06N 7/005; G06F 21/562; G06F 21/577; G06F 2221/033
See application file for complete search history.

(56) References Cited

U.S. PATENT DOCUMENTS

2004/0210906 A1* 10/2004 Beresnevichiene ..... G06F 21/52
719/310
2008/0120722 A1 5/2008 Sima et al.
(Continued)

FOREIGN PATENT DOCUMENTS

| EP | 2028806 A1 | 2/2009 |
| EP | 2472425 B1 | 9/2015 |
| WO | 2006054269 A3 | 5/2006 |

OTHER PUBLICATIONS

Tripp, et al., "Aletheia: Improving the usability of static security analysis", Proceedings of the 2014 ACM SIGSAC Conference on Computer and Communications Security, ACM, 2014, 13 pages. (Year: 2014).*

(Continued)

*Primary Examiner* — Kakali Chaki
*Assistant Examiner* — Vasyl Dykyy
(74) *Attorney, Agent, or Firm* — Amin, Turocy & Watson, LLP

(57) ABSTRACT

Techniques for generating a warning filter to filter the warnings output from a static program analysis tool are provided. In one example, a computer-implemented method comprises determining feature vector data for a set of warnings, wherein the set of warnings is generated in response to static analysis of a computer program, and wherein the feature vector data comprises a feature vector indicative of an attribute of a warning of the set of warnings. The computer-implemented method also comprises determining a warning filter that identifies a first subset of the set of warnings as representing true positives based on the feature vector data and classified warning data, and wherein the classified warning data represents a second subset of the set of warnings that have been classified to indicate whether (Continued)

respective members of the second subset are indicative of true positives.

10 Claims, 10 Drawing Sheets

(56) References Cited

U.S. PATENT DOCUMENTS

| | | | | |
|---|---|---|---|---|
| 2008/0320457 | A1* | 12/2008 | King | G06F 11/3616 |
| | | | | 717/146 |
| 2011/0055123 | A1 | 3/2011 | Kennedy | |
| 2011/0276949 | A1* | 11/2011 | Otenko | G06F 11/3452 |
| | | | | 717/131 |
| 2015/0052609 | A1 | 2/2015 | Jordan et al. | |
| 2015/0379271 | A1* | 12/2015 | Allen | G06F 21/577 |
| | | | | 726/25 |
| 2016/0065603 | A1 | 3/2016 | Dekel et al. | |
| 2017/0024505 | A1* | 1/2017 | Pam | G06F 17/5045 |

OTHER PUBLICATIONS

Steven Arzt, Siegfried Rasthofer, Robert Hahn, Eric Bodden, Using targeted symbolic execution for reducing false-positives in dataflow analysis, Proceedings of the 4th ACM SIGPLAN International Workshop on State of the Art in Program Analysis, p. 1-6, Jun. 14-14, 2015, Portland, OR, USA (Year: 2015).*

Tripp, et al., "Aletheia: Improving the usability of static security analysis", Proceedings of the 2014 ACM SIGSAC Conference on Computer and Communications Security, ACM, 2014, 13 pages.

* cited by examiner

WARNING FILTER BASED ON MACHINE LEARNING

BACKGROUND

The subject disclosure relates to filtering data, and more specifically, to filtering warnings generated in response to program analysis of a computer program based on machine learning techniques

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment of the present invention, a system can comprise a memory that stores computer executable components and a processor that executes computer executable components stored in the memory. The computer executable components can comprise a feature mapping component that can receive warning data. The warning data can represent a set of warnings generated in response to a static program analysis of computer program data. The feature mapping component can generate feature vector data representing attributes of the set of warnings. The system can further comprise a statistical learning component that can receive classified warning data. The classified warning data can represent a first subset of the set of warnings. A first warning of the first subset can be classified to indicate whether the first warning represents a false positive. The statistical learning component can further generate a warning filter. The warning filter can identify a second subset of the set of warnings as representing false positives based on the classified warning data and the feature vector data.

In some embodiments, elements described in connection with the system can be embodied in different forms such as a computer-implemented method, a computer program product, or another form.

DETAILED DESCRIPTION

Figure 1:
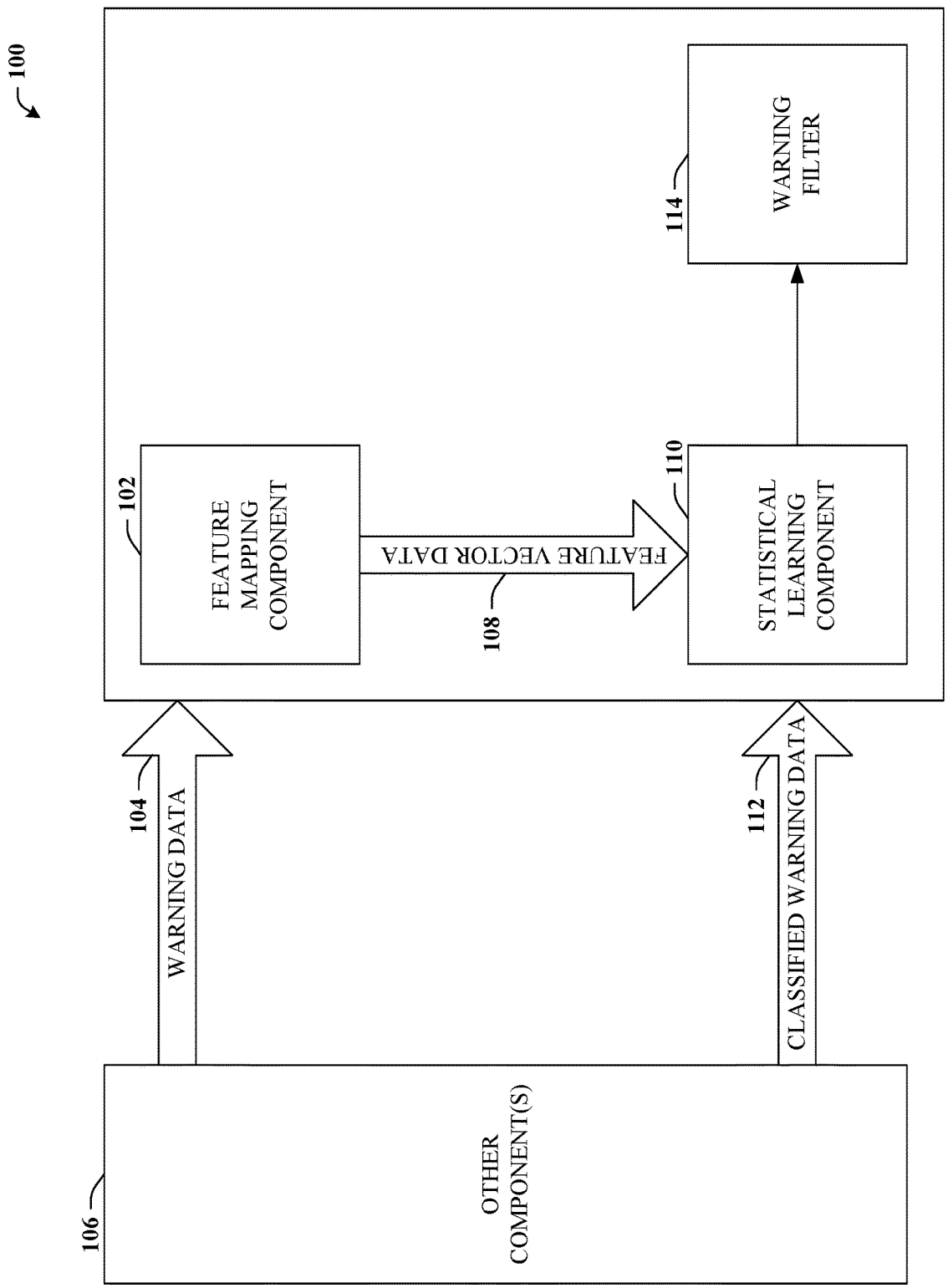
FIG. 1 illustrates a block diagram of an example, non-limiting system that generates a filter for warnings issued by static program analysis in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Program analysis can be employed to identify potential errors, bugs, security vulnerabilities, or the like. Program analysis applications typically output a set of warnings that provide a description and other details of the potential error, bug, security vulnerability, etc. Program analysis can be broadly categorized as either dynamic program analysis or static program analysis. For example, dynamic program analysis is typically fast and scales well to large programs (e.g., industry-scale software systems) but usually employs the program being executed in order to function and also usually utilizes access to source code. Hence, dynamic program analysis generally calls for the program to be installed (which consumes resources (e.g., time, memory, processing, etc.) and executed (which can expose the analysis system to security threats). Since dynamic program analysis functions during execution of the computer program being analyzed, a full analysis calls for every code segment to be executed (which is generally infeasible, if not impossible). For example, every code branch, every possible input, or other possible permutations may be infinite or too numerous to test. Thus, dynamic program analysis generally may not be able to discover all potential errors, bugs, or other warnings.

In various embodiments described herein, static program analysis is employed. One or more embodiments of static program analysis can differ from dynamic program analysis in a number of ways. For instance, static program analysis does not require the program being analyzed to be installed or executed. Thus, one or more embodiments of static program analysis can provide benefits in terms of resource consumption and risk exposure. Moreover, static program analysis can operate on source code or object code, which can be useful for analysis of libraries or other program elements for which the associated source code is not available. In some embodiments, static program analysis can take longer to complete and may not scale as well to large programs compared to dynamic program analysis. However, one or more embodiments of static program analysis can have a greater likelihood of identifying potential errors or other warnings.

Static program analysis typically operates by examining computer program statements and/or instructions in order to build a mathematical model for the computer program. The model can be used to infer properties of the computer program. While use of the model can identify potential errors, static program analysis can suffer from different forms of imprecision. For example, in order to handle industry-scale applications, static program analysis can apply aggressive approximations in some embodiments. Notable dimensions of precision loss can include: flow insensitivity (where the analysis does not track the order in which memory updates occur and instead conservatively accounts for possible update orders); path insensitivity (where the analysis ignores path conditions, thereby traversing infeasible execution paths); and context insensitivity (where the analysis can forgo modeling the calling context of a method, thereby analyzing infeasible invocation scenarios).

These and other sources of inaccuracy can shrink the analysis' state space (also known as the abstract state) by an exponential factor, and hence provide a significant contribution to the scalability of the analysis. As an example, if path conditions are accounted for, then the analysis typically has to track two different runtime program states when reaching a branching condition. Path insensitivity can save the analysis from this type of state-space blowup, but at the cost of using approximations that are conservatively applied to account for all possibilities. In other words, in some embodiments, without using approximations, the state-space can grow so large as to be incapable of being stored in memory, particularly with industry-scale software. Using approximations such as those detailed above can mitigate the growth of the state-space, allowing for scalability for static program analysis.

The approximations can be conservative in nature so that all (or one or more) possible states are ultimately accounted for and, unlike with dynamic program analysis, applied such that no false negatives (e.g., errors or vulnerabilities not detected) will exist. However, such approximations applied by the static analysis, can result in false positives. The term "false positive" is used herein to refer to a warning issued by the analysis, but for which no remedy is necessary (or recommended) or the issue identified by the warning is not a true error, bug, vulnerability or the like. False positives can occur due to various reasons, including e.g., infeasible control flow, wherein the approximation contains invalid branching decisions or call sites that are resolved incorrectly; ignoring of downgrading operations, such as if a proprietary downgrader is applied or downgrading occurs inline; and imprecise tracking of data flow, e.g., due to coarse modeling of string operations and/or aliasing between variables; and so forth.

While approximation enables scalability, such approximation can also result in an excess of false positives. Warnings that are false positives can plague the reports by static program analysis tools, thereby hindering their usability. According to interviews with professional developers, false positive excesses are the most significant barrier to adoption by developers of tools based on static program analysis. Thus, developers overwhelmingly choose dynamic program analysis tools, even though such tools are not adequate to identify all errors or vulnerabilities. Unfortunately, developers tend to prefer to release and deploy software that has not been fully vetted rather than find and fix latent errors or vulnerabilities using static program analyzers.

One or more embodiments of the disclosed subject matter can improve the usability of static program analysis. For example, in some embodiments, warnings or other output of static program analysis can be cleansed or filtered, for example, to identify and filter from the output, a significant proportion of false positives. In some embodiments, the disclosed filtering techniques can be provided irrespective of the application and/or not specific to a given static analysis tool or technique. In other words, the filtering techniques can have a degree of generality. For instance, one or more embodiments of the filtering techniques can treat analysis as opaque and/or as a black box, e.g., to allow for wide applicability and ease of integration into legacy as well as new analysis tools. Thus, one or more embodiments described herein can be implemented with substantially any static program analysis product or output.

In some embodiments, the filtering techniques can provide a degree of customizability. For example, different users (e.g., software developers) can have different preferences when reviewing warnings. For example, some users may prefer to suppress false positives aggressively, even at the expense of eliminating some true positives, whereas other users may opt for completeness at the price of more false positives.

Guided by such generality and customizability, the disclosed subject matter, in one or more embodiments, can provide for filtering false positives in a manner that combines lightweight user interaction with heavyweight automation. For example, the user can classify a small portion of the raw warnings output by a static program analysis tool, which can be referred to as classified warnings and/or can be used to train classification algorithms or other elements utilized to generate the filter. The user can also specify a policy for weighting the tradeoff between elimination of false positives and preservation of true positives. In some embodiments, the specification can be provided by one or more automated systems, machines, computer program products or the like.

In some embodiments, the warnings, classified warnings, and/or policy can be provided as inputs to a statistical learning engine. The learning engine can abstract the warnings into feature vectors that can be employed to build a filter. The filter can be instantiated according to the policy, and can be applied to remaining warnings, which can result in much fewer warnings than the number initially reported by the static program analysis. Ideally, all or virtually all of the filtered warnings may be false positives and only a tiny fraction of the false positives of the initial report may remain. Such may, in some embodiments, increase the usability of static program analysis in connection with security or other domains.

In some embodiments, machine learning used to develop classification algorithms or the like can be based on the warnings alone. In some embodiments, filtering performed by the classification algorithms can be performed without any assumptions about, or access to, the internal aspects of the static program analysis tool.

Turning now to the drawings, FIG. 1 illustrates a block diagram of an example, non-limiting system 100 that generates a filter for warnings issued by static program analysis in accordance with one or more embodiments of the disclosed subject matter. In some embodiments, system 100 can generate the filter based on machine-learning and/or statistical learning techniques. System 100 and/or the components of the system 100 can be employed to use hardware and/or software to solve problems that are highly technical in nature, that are not abstract, and that cannot be performed as a set of mental acts by a human, e.g., analyzing object code and storing all possible program states in some embodiments. Further, some of the processes performed can be performed by specialized computers for carrying out defined tasks related to static program analysis. System 100 and/or components of system 100 or other systems described herein can be employed to solve new problems that arise through advancements in technology, computer networks, the Internet, and the like. The system 100 can provide technical improvements to program analysis in general, and more specifically to static program analysis and related domains. For instance, system 100 can generate a filter that can be employed to filter out a significant portion of false positive warnings typically output by static program analysis tools, which can increase the usability, acceptance, and implementation of such tools.

System 100 can comprise a processor and a memory that stores executable instructions that, when executed by the processor, facilitate performance of operations. Examples of said processor and memory, as well as other suitable computer or computing-based elements, can be found with reference to FIG. 10, and can be used in connection with implementing one or more of the systems or components shown and described in connection with FIG. 1 or other figures disclosed herein.

In this example, system 100 can include feature mapping component 102. System 100 and/or feature mapping component 102 can receive warning data 104. Warning data 104 can be or can represent a set of warnings generated in response to a static program analysis of computer program data. For example, computer program data (e.g., software) can be created in an integrated development environment (IDE) or another programming tool, which can be one or more other components 106 or integrated with system 100. Such tools can have static analysis features or elements that can be instantiated to examine the work product (e.g., computer program data such as source code or object code) of the software developer according to static program analysis. Output of the static program analysis tool can be a set of warnings relating to errors, vulnerabilities, etc, which is represented by warning data 104. For example, sensitive information such as credit card information can be exposed by a program, and such can represent a security vulnerability.

In response to receiving warning data 104, feature mapping component 102 can generate feature vector data 108, which can represent or describe attributes of the set of warnings of warning data 104. For example, in some embodiments, feature mapping component 102 can generate one or more feature vectors for each warning (or, in some embodiments, for one or more warnings) of warning data 104. Thus, feature vector data 108 can represent a set of feature vectors, wherein each feature vector (or one or more feature vectors) represents one or more attributes of a respective warning of the warning data 104.

Figure 2:
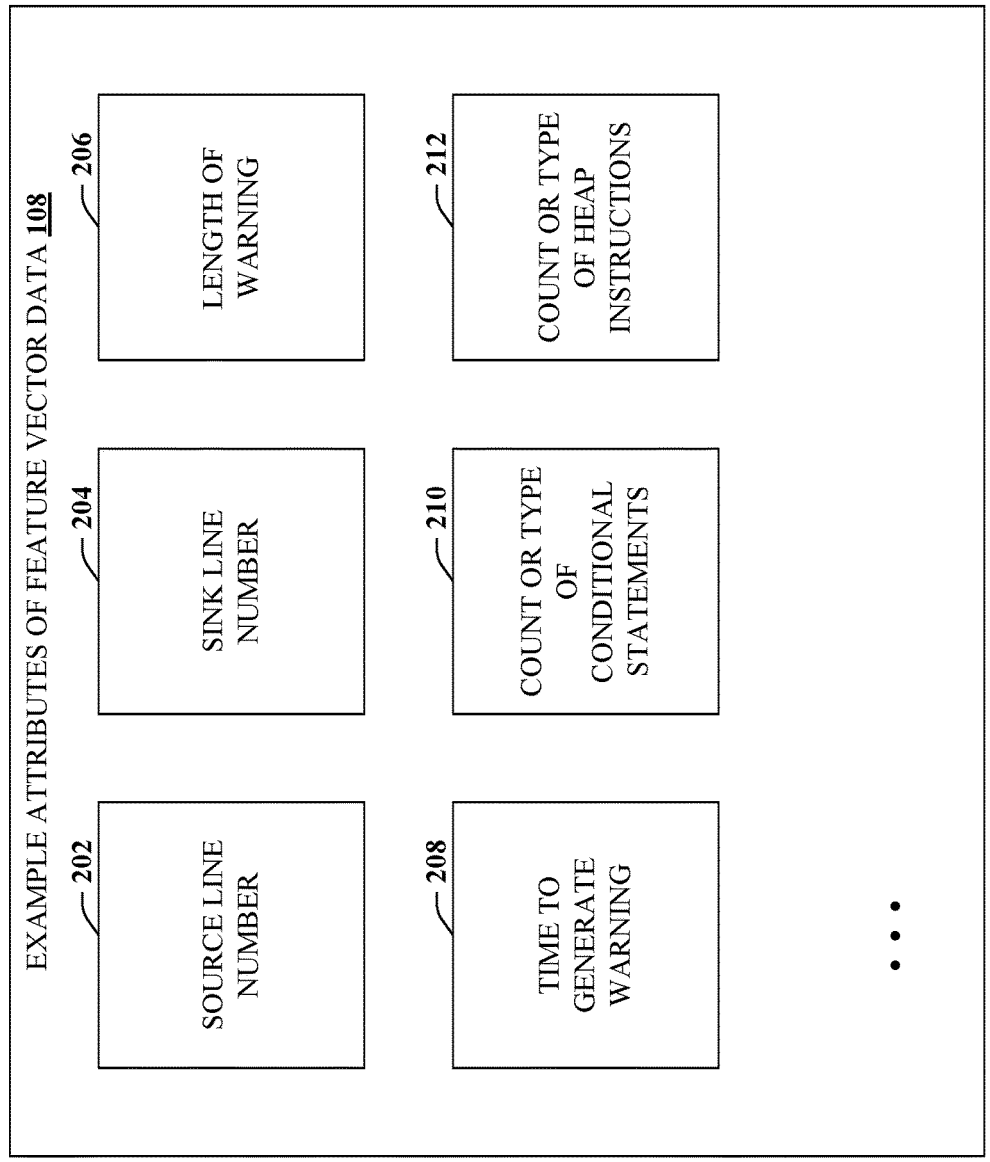
FIG. 2 illustrates a block diagram of non-limiting examples of attributes abstracted from warnings and representing features of feature vectors described by feature vector data in accordance with one or more embodiments described herein.

In some embodiments, in order to cast the warnings into a statistical setting, feature mapping component 102 can derive simple-structured features from the warnings. It is understood that such warnings are typically complex objects that generally cannot tractably be learned directly. Feature mapping component 102 can abstract a given warning as a set of attributes and the attribute of the set of attributes can be mapped to a feature of an associated feature vector. FIG. 2 provides examples of the attributes that can be abstracted from warnings.

While still referring to FIG. 1, but turning now as well to FIG. 2, system 200 is depicted. System 200 illustrates a block diagram of non-limiting examples of attributes abstracted from warnings and representing features of feature vectors described by feature vector data 108 in accordance with certain embodiments of the disclosed subject matter. Repetitive description of like elements employed in other embodiments described herein is omitted for sake of brevity.

For instance, an example attribute can be source line number 202, which can be a line number or other indicia of a source or entry point identified by the warning. For example, the warning can identify a line number where sensitive data enters the computer program, which can be useful, e.g., to track security vulnerabilities. Another example attribute can be sink line number 204, which can be a line number or other indicia of a sink or exit point identified by the warning. For example, the warning can identify a line number where the sensitive data exits the computer program. Length of warning 206 can be another attribute that can provide a count of a number of lines of the warning. For example, length of warning 206 can be a count of the number of lines of the program flow between source line number 202 and sink line number 204.

Still another example attribute can be time to generate warning 208, which can represent amount of time utilized to generate the warning. The attribute can further be a count or type of conditional statements 210 included in the program flow of the warning or a count or type of heap instructions 212 included in the program flow of the warning. Other examples can exist such as a size of a counterexample reported by the static analysis, etc.

Still referring to FIG. 1, system 100 can further include statistical learning component 110. Statistical learning component 110 can receive feature vector data 108 (e.g., comprising feature vectors derived from warning data 104). Statistical learning component 110 can further receive classified warning data 112. Classified warning data 112 can represent a first subset of the set of warnings of warning data 104. The first subset of warnings can include a first warning that is classified to indicate whether the first warning represents a false positive or a true positive, which is further detailed in connection with FIG. 3. Classified warning data 112 can be received from one or more other components 106, an example of which is provided with reference to FIG. 3.

Statistical learning component 110 can further generate warning filter 114. Warning filter 114 can identify a second subset of the set of warnings as representing false positives based on the classified warning data 112 and the feature vector data 108. In some embodiments, statistical learning component 110 can generate warning filter 114 to identify another subset of the set of warnings as representing true positives based on the classified warning data 112 and the feature vector data 108. For example, statistical learning component 110 can use classified warning data 112 to train warning filter 114. In some embodiments, statistical learning component 110 can employ machine-learning techniques to generate or train warning filter 114, which is further detailed in connection with FIGS. 5 and 6.

Figure 3:
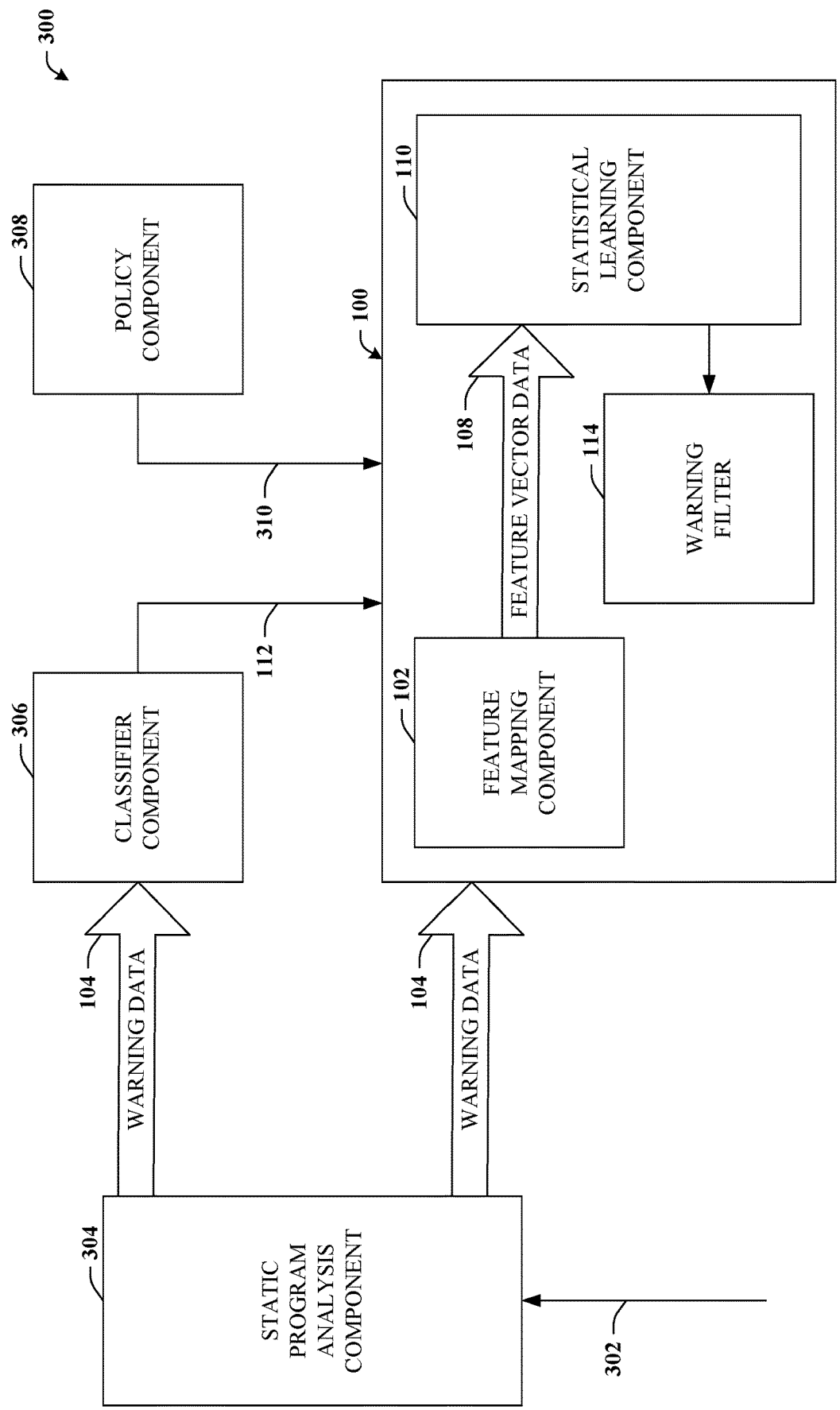
FIG. 3 illustrates examples of additional elements or aspects in connection with generating a filter for warnings issued by static program analysis in accordance with one or more embodiments of the disclosed subject matter.

Turning now to FIG. 3, system 300 is depicted. System 300 illustrates examples of additional elements or aspects in connection with generating a filter for warnings issued by static program analysis in accordance with one or more embodiments of the disclosed subject matter. Repetitive description of like elements employed in other embodiments described herein is omitted for sake of brevity.

In some embodiments, system 300 can represent a portion of an IDE. System 300 can include all or portions of system 100 as detailed herein. System 300 can be utilized to generate or execute computer software such as computer program data 302. Computer program data 302 can represent a computer application or program and can be in the form of source code or object code. System 300 can further include static program analysis component 304 that can apply static program analysis to computer program data 302. In response, static program analysis component 304 can issue a set of warnings relating to computer program data 302. This set of warnings can be, or can be represented by, warning data 104.

As detailed in connection with FIG. 1, warning data 104 can be employed by feature mapping component 102 to derive feature vector data 108. In some embodiments, all or a portion of warning data 104 can be provided to classifier component 306. Classifier component 306 can present the details of a particular warning for review (e.g., by a developer). Classifier component 306 can, in response, receive (e.g., from the developer) input regarding the veracity of the warning. For example, if it is determined that the warning is a false positive, then input indicating such can be received. If it is determined that the warning is a true positive (e.g., a true error or vulnerability, etc.), then input indicating such can be received. Such input can be based on analysis of the associated warning (e.g., by the developer) and can be in the form of Boolean input (e.g., true or false) or another suitable format. The warning can be combined with the classifying input (e.g., an indication of whether the warning is a true positive or a false positive) to generate classified warning data 112.

It is understood that, in some embodiments, only a subset of all warnings are to be classified and a remaining portion can be filtered by warning filter 114 that learns from the classified warnings. In various different embodiments, a number of warnings to be classified can be about 100 or 200 warnings, or fewer. Hence, classifier component 306 need only receive a subset of warnings rather than the entire set of warnings of warning data 104. In some embodiments, the subset of warnings selected to be classified can be randomly determined, e.g., to provide a random sampling of the data. Other selection techniques can be employed as well.

System 300 can further comprise policy component 308 that can generate policy data 310. Policy data 310 can represent a weighting policy associated with warning filter 114. In some embodiments, this weighting policy can be indicative of a weighting of importance between reduction of false positives and identification of true positives. For example, policy data 310 can be generated in response to input to a slider mechanism that can be manipulated and/or modified to a value (or preference) between values on two opposing sides (or preferences), one representing aggressive reduction of false positives (perhaps at the cost of filtering out some true positives) and the other representing conservative reduction of false positives, with an emphasis on not filtering true positives.

As described, in one or more embodiments, statistical learning component 110 can generate warning filter 114 based on classified warning data 112 and feature vector data 108. In some embodiments, statistical learning component 110 can also generate warning filter 114 based on policy data 310. It is understood that in some embodiments, use of policy data 310 to generate warning filter 114 can provide for richer customizability. For example, warning filter 114 can be customized to suit the particular application or a particular developer. In some embodiments, all or portions of component 304, 306, and 308 can be represented as other components 106 of FIG. 1. In some embodiments, all or portions of static program analysis component 304, classifier component 306, or policy component 308 can be included in system 100.

Figure 4:
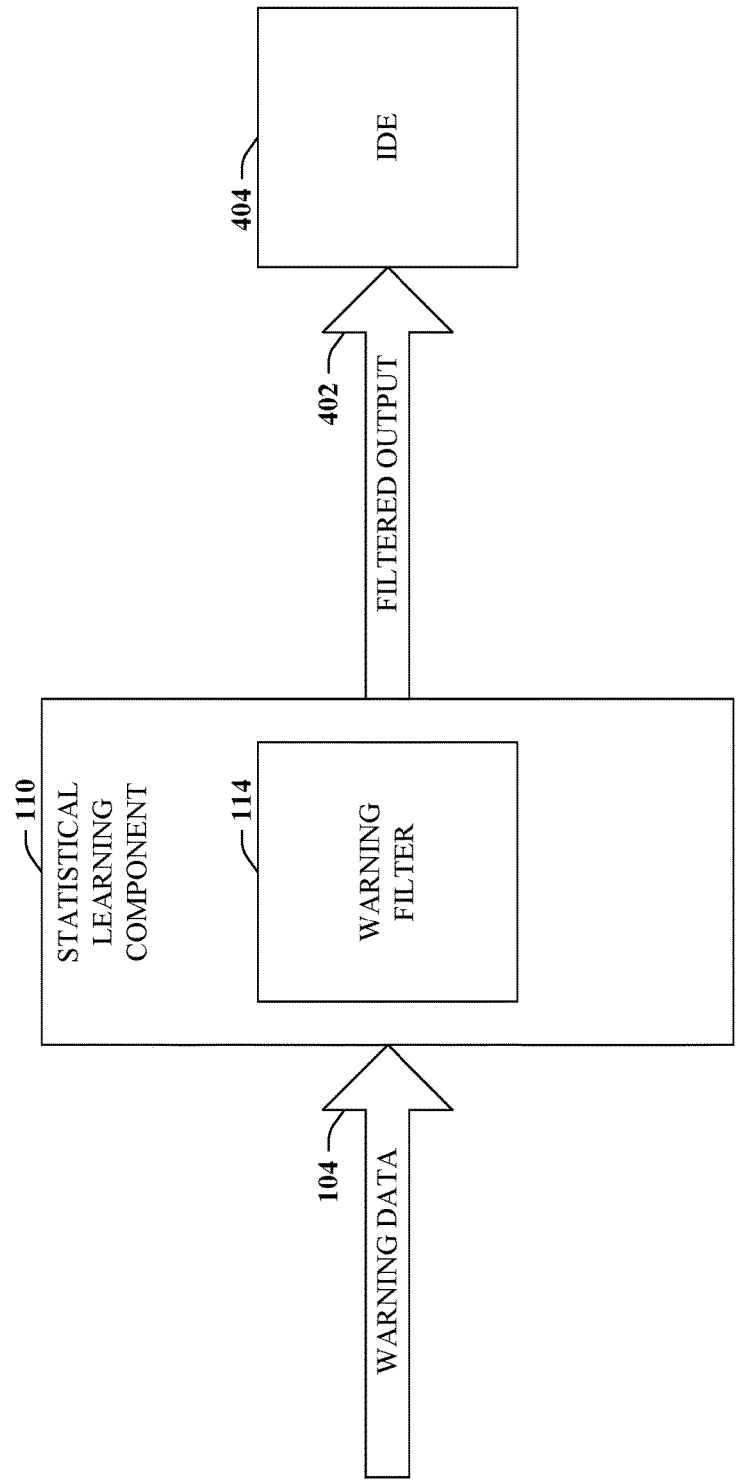
FIG. 4 illustrates a block diagram of an example, non-limiting system that can apply the warning filter to the warning data in accordance with one or more embodiments of the disclosed subject matter.

With reference now to FIG. 4, system 400 is depicted. System 400 illustrates an example of applying the warning filter to the warning data in accordance with one or more embodiments of the disclosed subject matter. Repetitive description of like elements employed in other embodiments described herein is omitted for sake of brevity.

Statistical learning component 110 or another suitable component can receive all or a portion of warning data 104. It is understood that not all the set of warnings of warning data 104 need be received. For example, the subset of warnings that were classified to produce classified warning data 112 need not be subjected to warning filter 114, as false positives for such warnings will have already been identified.

In response, statistical learning component 110 can generate filtered output 402. Filtered output 402 can be generated in response to applying warning filter 114 to the set of warnings received. In some embodiments, the filtered output 402 can represent a subset of the set of warnings that comprises or consists of warnings determined (e.g., by statistical learning component 110) to be true positives based on application of warning filter 114. In some embodiments, filtered output 402 can represent a subset of the set of warnings that excludes warnings determined (e.g., statistical learning component 110) to be false positives. In some embodiments, using warning filter 114 to generate filtered output 402 can improve the usability of static program analysis.

For example, suppose the static program analysis generates 10,000 warnings and approximately one hundred of those warnings are classified (and therefore used by statistical learning component 110 to generate warning filter 114). The remaining 9,900 warnings can be received by warning filter 114, which in some embodiments can remove more than 90% of false positives, in some cases even without removing any true positives. Such can, in some embodiments, dramatically increase the appeal of static program analysis to developers and enable static program analysis to compete favorably with dynamic program analysis. Moreover, in some embodiments, generation of the warning filter 114 can be utilized to filter output from different computer programs. Hence, the resources required to generate classified warning data 112 such as a developer manually inspecting a number (e.g., 100, 200, etc.) of warnings in order to classify those warnings can be a one-time investment. In some embodiments, filtered output 402 can be provided to and/or presented by a programming tool such as IDE 404.

Figure 5:
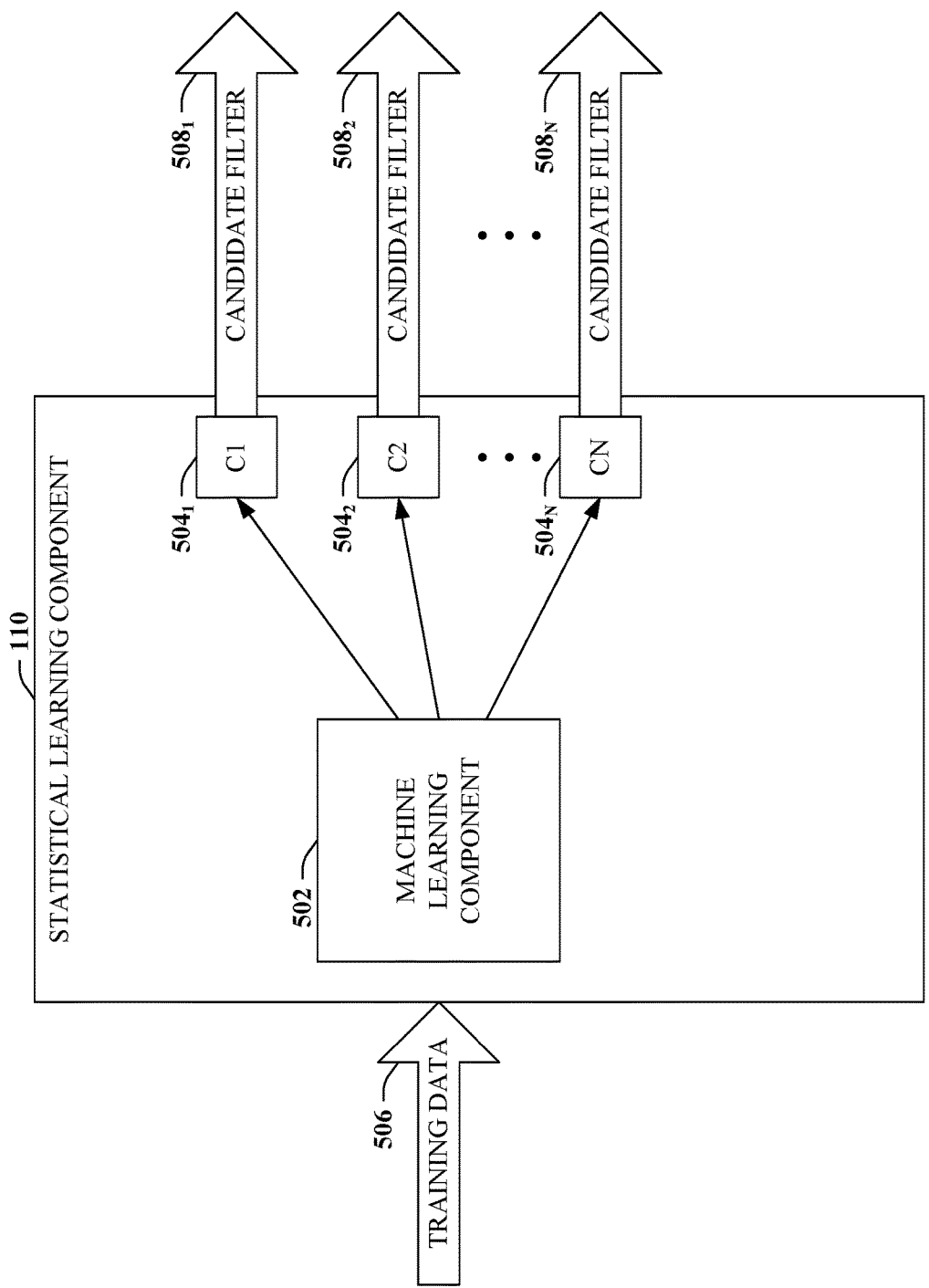
FIG. 5 illustrates a block diagram of an example, non-limiting system that can provide for machine learning-based training of classification algorithms for candidate filters in accordance with one or more embodiments of the disclosed subject matter.

With reference now to FIG. 5, system 500 is depicted. System 500 illustrates a non-limiting example of machine learning-based training of classification algorithms for candidate filters in accordance with one or more embodiments of the disclosed subject matter. Repetitive description of like elements employed in other embodiments described herein is omitted for sake of brevity. Statistical learning component 110 can include machine learning component 502.

Machine learning component 502 can be utilized to train a number, N, classification algorithms, labeled here as $504_1$-$504_N$, wherein N can be substantially any positive integer. Classification algorithms $504_1$-$504_N$ are referred to herein, either individually or collectively, as classification algorithm(s) 504 with appropriate subscripts generally employed when instructive or convenient to highlight various distinctions or to better impart the disclosed concepts. Machine learning component 502 can train classification algorithms $504_1$-$504_N$ based on training data 506. In some embodiments, training data 506 can be a subset of warning data 104. In some embodiments, training data 506 can be all or a portion of classified warning data 112.

For example, machine learning component 502 can use the subset (e.g., 100-200 or some other number) of warnings that were classified by classifier component 306 in response to (e.g., Boolean) classification input (e.g., from a developer) indicating whether respective warnings are true positives or false positives. Hence, machine learning component 502 can analyze one or more attributes of one or more feature vectors of corresponding warnings in the context of the classification input in order to learn the attributes that tend to be either true positives or false positives. Examples of such attributes can be found with reference to FIG. 2. For instance, a particular classification algorithm 504 may be trained to identify warnings with a particular source line number 202 or sink line number 204 as a false positive (or a true positive) based on training data 506 with the same source line number 202 or sink line number 204 that were classified as a false positive (or a true positive). As another example, a particular classification algorithm 504 may be trained to infer warnings are increasingly more likely to be false positives with increasing program flow length (e.g., length of warning 206) if such a characteristic is identified from training data 506.

Machine learning component 502 and/or statistical learning component 110 can utilize the classification algorithms to generate candidate filters $508_1$-$508_N$. Candidate filters $508_1$-$508_N$ can represent candidate filters. Candidate filters $508_1$-$508_N$ can differ from one another based on the differences between corresponding classification algorithms $504_1$-$504_N$. Classification algorithms 504 can represent one or more algorithms used by a corresponding candidate filter $508_1$-$508_N$. In other words, machine learning component 502 and/or statistical learning component 110 can generate a set of candidate filters $508_1$-$508_N$ that differ based on respective classification algorithms $504_1$-$504_N$ that are trained according to a machine-learning technique. The set of candidate filters $508_1$-$508_N$ can comprise warning filter 114.

Figure 6:
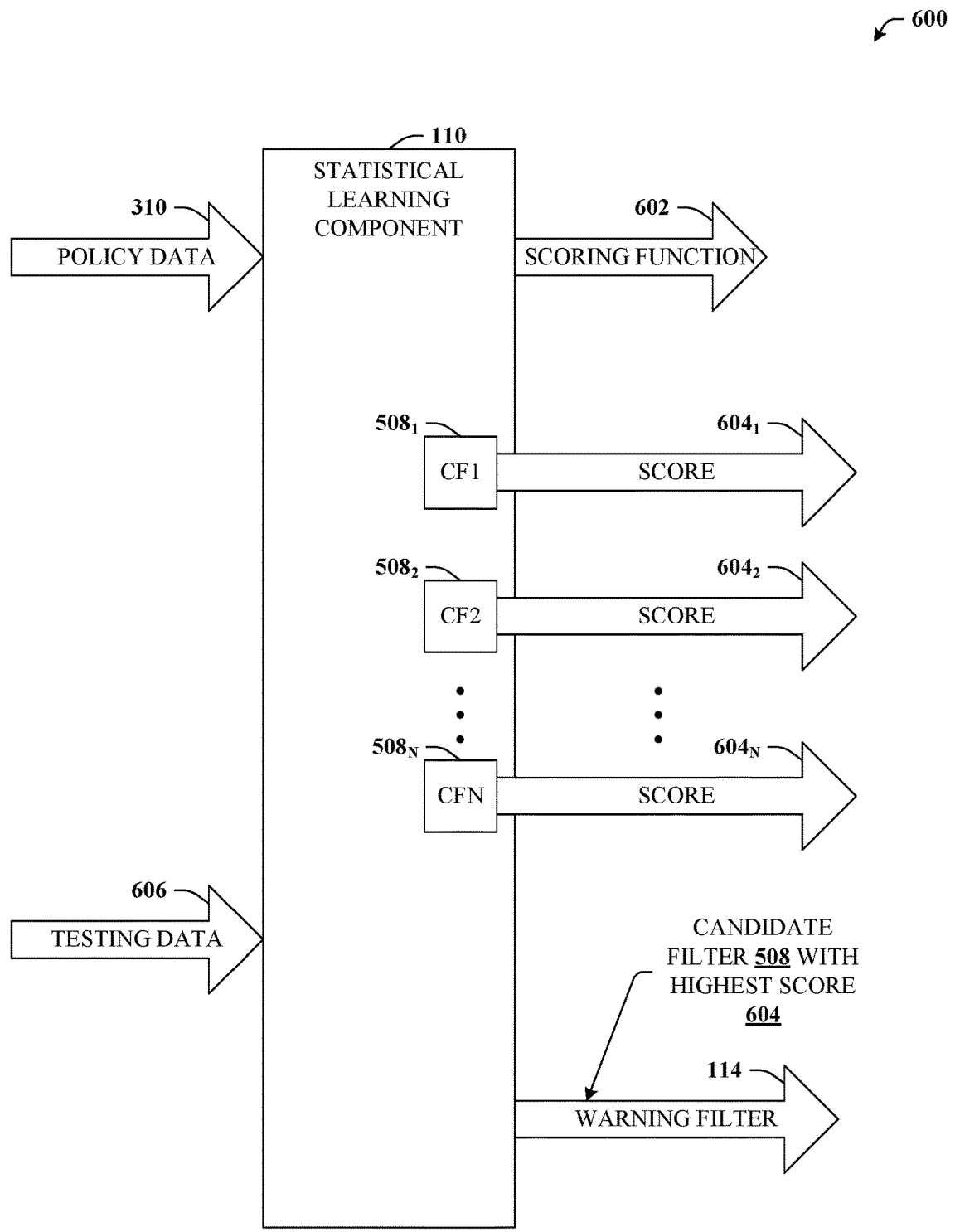
FIG. 6 illustrates a block diagram of an example, non-limiting system that can provide for testing and scoring of the candidate filters to select the warning filter in accordance with one or more embodiments of the disclosed subject matter.

Turning now to FIG. 6, system 600 is depicted. System 600 illustrates a non-limiting example of testing and scoring of the candidate filters to select the warning filter in accordance with one or more embodiments of the disclosed subject matter. Repetitive description of like elements employed in other embodiments described herein is omitted for sake of brevity. In some embodiments, statistical learning component 110 can determine scoring function 602. Scoring function 602 can be derived from policy data 310.

Scoring function 602 can be employed to determine respective scores $604_1$-$604_N$ for candidate filters $508_1$-$508_N$. Candidate filters $508_1$-$508_N$ and scores $604_1$-$604_N$ can be referred to herein either individually or collectively as candidate filter(s) 508 and score(s) 604, respectively, with appropriate subscripts generally employed only when instructive or convenient to highlight various distinctions or to better impart the disclosed concepts. Scores 604 can be determined based on a rate of identification of all or a portion of true positives, false positives, and false negatives, or combinations thereof. In some embodiments, identification of false negatives can be assigned a highest value of the scoring function, identification of true positives a next highest value, with identification of false positives have a lower value of the scoring function. Such can reflect, for example, a higher importance associated with ensuring the filter does not produce false negatives, and also is effective and not removing true positives. Statistical learning component 110 can select the particular candidate filter 508 with the highest score 604. The candidate filter 508 with the highest score 604 can be representative of warning filter 114 that can be used to filter remaining portions of warning data 104.

In some embodiments, statistical learning component 110 can assign scores 604 to candidate filters 508 based on testing data 606. For example, candidate filters 508 can be applied to testing data 606 and the results scored based on filtering performance. In some embodiments, testing data 606 can represent a subset of the set of warnings of warning data 104. In some embodiments, the size of testing data 606 can have the same or substantially similar size as training data 506. For example, if training data 506 represents about 100 or 200 warnings, then testing data 606 can represent about 100 or 200 warnings. For example, testing data 606 can be input to candidate filters 508 and the filtered results of each examined and scored, and warning filter 114 selected based on individual score 604.

Figure 7:
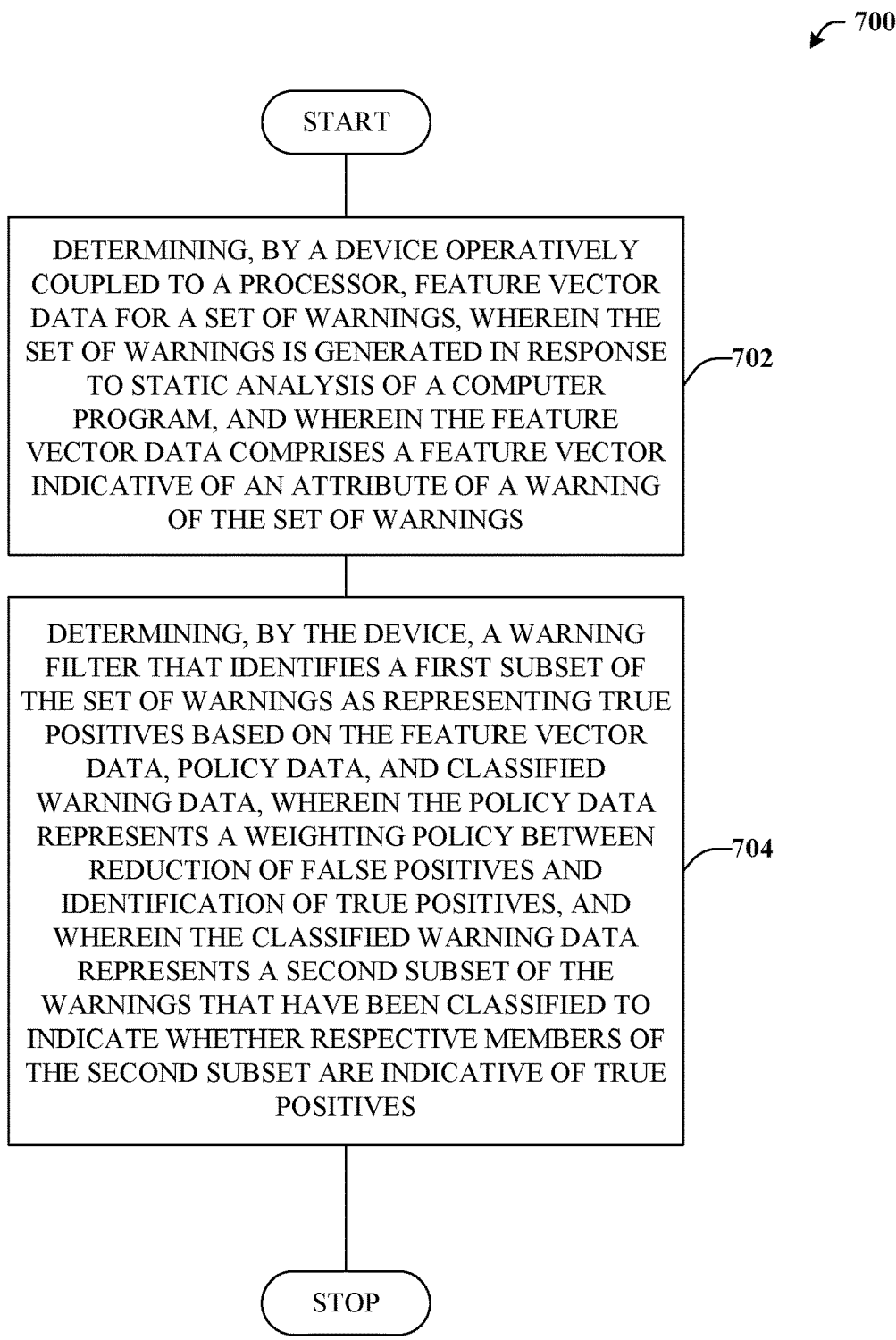
FIG. 7 illustrates a flow diagram of an example, non-limiting computer-implemented method that can generate a filter for warnings issued by static program analysis in accordance with one or more embodiments of the disclosed subject matter.
Figure 8:
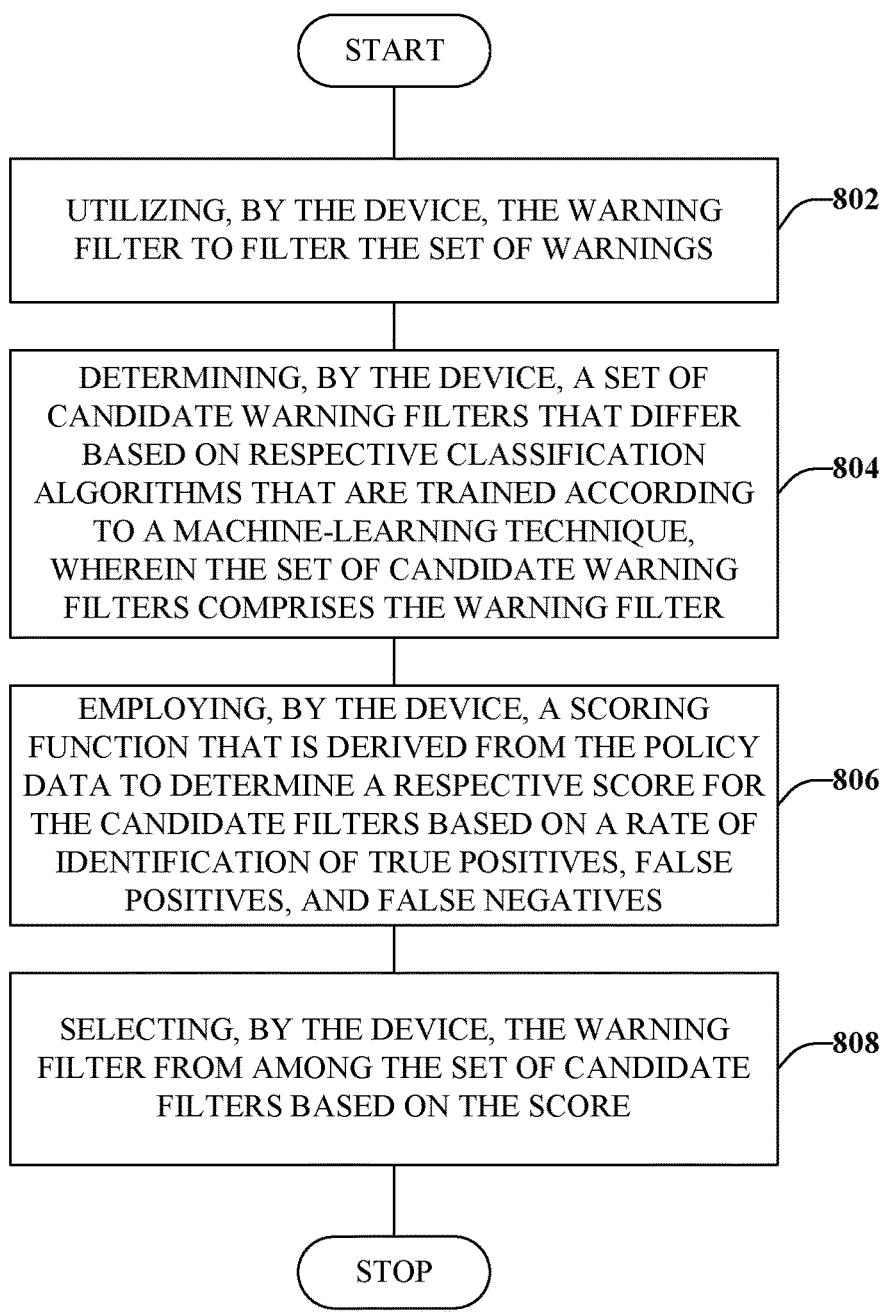
FIG. 8 illustrates a flow diagram of an example, non-limiting computer-implemented method that can provide for additional aspects or elements for generating the filter for warnings issued by static program analysis and selecting a particular filter from a set of candidate filters in accordance with one or more embodiments of the disclosed subject matter.
Figure 9:
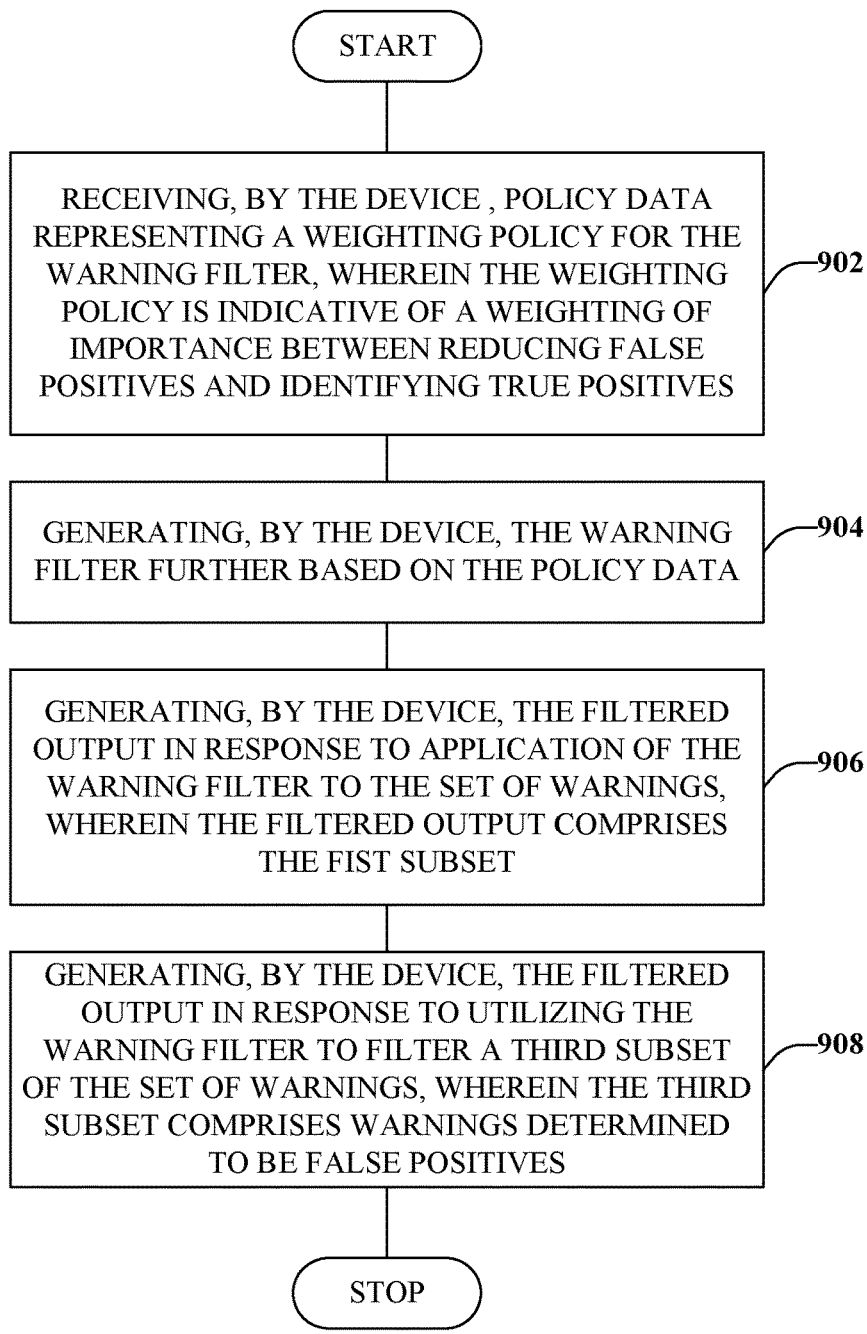
FIG. 9 illustrates a flow diagram of an example, non-limiting computer-implemented method that can provide for additional aspects or elements for generating the filter for warnings issued by static program analysis in accordance with one or more embodiments of the disclosed subject matter.

FIGS. 7-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 7 illustrates a flow diagram of an example, non-limiting computer-implemented method that can generate a filter for warnings issued by static program analysis in accordance with one or more embodiments of the disclosed subject matter. Repetitive description of like elements employed in other embodiments described herein is omitted for sake of brevity. At reference numeral 702, a device (e.g., system 100, 300) operatively coupled to a processor can determine feature vector data for a set of warnings, wherein the set of warnings is generated in response to static analysis of a computer program, and wherein the feature vector data comprises a feature vector indicative of an attribute of a warning of the set of warnings. The computer program can be representative of source code or object code. The static analysis can be based on substantially any static program analysis that builds a mathematical model of the computer program that identifies all or substantially all potential errors or vulnerabilities and/or does not produce false negatives in connection with potential errors or vulnerabilities. In some embodiments, the feature vector data comprises a set of feature vectors, wherein a feature vector of the feature vectors describes the attributes of a warning of the set of warnings.

At reference numeral 704, the device can determine a warning filter that identifies a first subset of the set of warnings as representing true positives based on the feature vector data, policy data, and classified warning data. The policy data can represent a weighting policy between reduction of false positives and identification of true positives. The classified warning data can represent a second subset of the warnings that have been classified to indicate whether respective members of the second subset are indicative of true positives.

In some embodiments, the device can determine a warning filter that identifies a different subset of the set of warnings as representing false positives based on the feature vector data, the policy data, and classified warning data, wherein the classified warning data represents another subset of the warnings that have been classified to indicate if respective members of the second subset are indicative of false positives.

Turning now to FIG. 8, illustrated is a flow diagram of an example, non-limiting computer-implemented method that can provide for additional aspects or elements for generating the filter for warnings issued by static program analysis and selecting a particular filter from a set of candidate filters in accordance with one or more embodiments of the disclosed subject matter. Repetitive description of like elements employed in other embodiments described herein is omitted for sake of brevity. At reference numeral 802, the device (e.g., system 100, 300) can utilize the warning filter to filter the set of warnings. In some embodiments, warnings that not filtered out by the filter can be output as filtered output. The filtered output can be provided to an IDE or another suitable program development tool and presented. In some embodiments, warnings that are filtered out by the filter can be discarded or stored and are not presented.

At reference numeral 804, the device can determine a set of candidate warning filters that differ based on respective classification algorithms that are trained according to a machine-learning technique, wherein the set of candidate warning filters comprises the warning filter. In some embodiments, the classification algorithms can be trained based on a set of classified warnings that have been classified to indicate whether the classified warnings respectively represent true positives or false positives.

At reference numeral 806, the device can employ a scoring function that is derived from the policy data to determine a respective score for the candidate filters based on a rate of identification of true positives, false positives, and false negatives. For example, candidate filters can be tested based on a testing set of warnings. Candidate filters that are more effective at identifying true positives and false positives and/or produce fewer false negatives can tend to have higher scores.

At reference numeral 808, the device can select the warning filter from among the set of candidate filters based on the score. For example, the warning filter that is selected to be used to filter the remaining set of warnings can be selected based on scores determined from the testing set of warnings.

Turning now to FIG. 9, illustrated is a flow diagram of an example, non-limiting computer-implemented method that can provide for additional aspects or elements for generating the filter for warnings issued by static program analysis in accordance with one or more embodiments of the disclosed subject matter. Repetitive description of like elements employed in other embodiments described herein is omitted for sake of brevity. At reference numeral 902, the device (e.g., system 100, 300) can receive policy data representing a weighting policy for the warning filter. The weighting policy can be indicative of a weighting of importance between reducing false positives and identifying true positives.

At reference numeral 904, the device can generate the warning filter further based on the policy data. For example, a given warning filter may not filter a given warning based on a confidence score or the like under other conditions, but may do so if the policy data is set to filter warnings aggressively. Conversely, a given warning filter may filter a given warning based on a confidence score or the like under other conditions, but may not do so if the policy data is set to filter warnings conservatively.

At reference numeral 906, the device can generate the filtered output (e.g., a subset of the set of warnings that survive the filter) in response to application of the warning filter to the set of warnings. In some embodiments, the filtered output comprises the first subset detailed in connection with reference numeral 704 of FIG. 7. For example, the first subset can be the subset of warnings identified as representing true positives and/or is exclusive of warnings identified as false positives.

At reference numeral 908, the device can generate the filtered output in response to utilizing the warning filter to filter a third subset of the set of warnings. The third subset of the set of warnings can comprise warnings determined to be false positives. Said differently, the filter can filter out the third subset.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
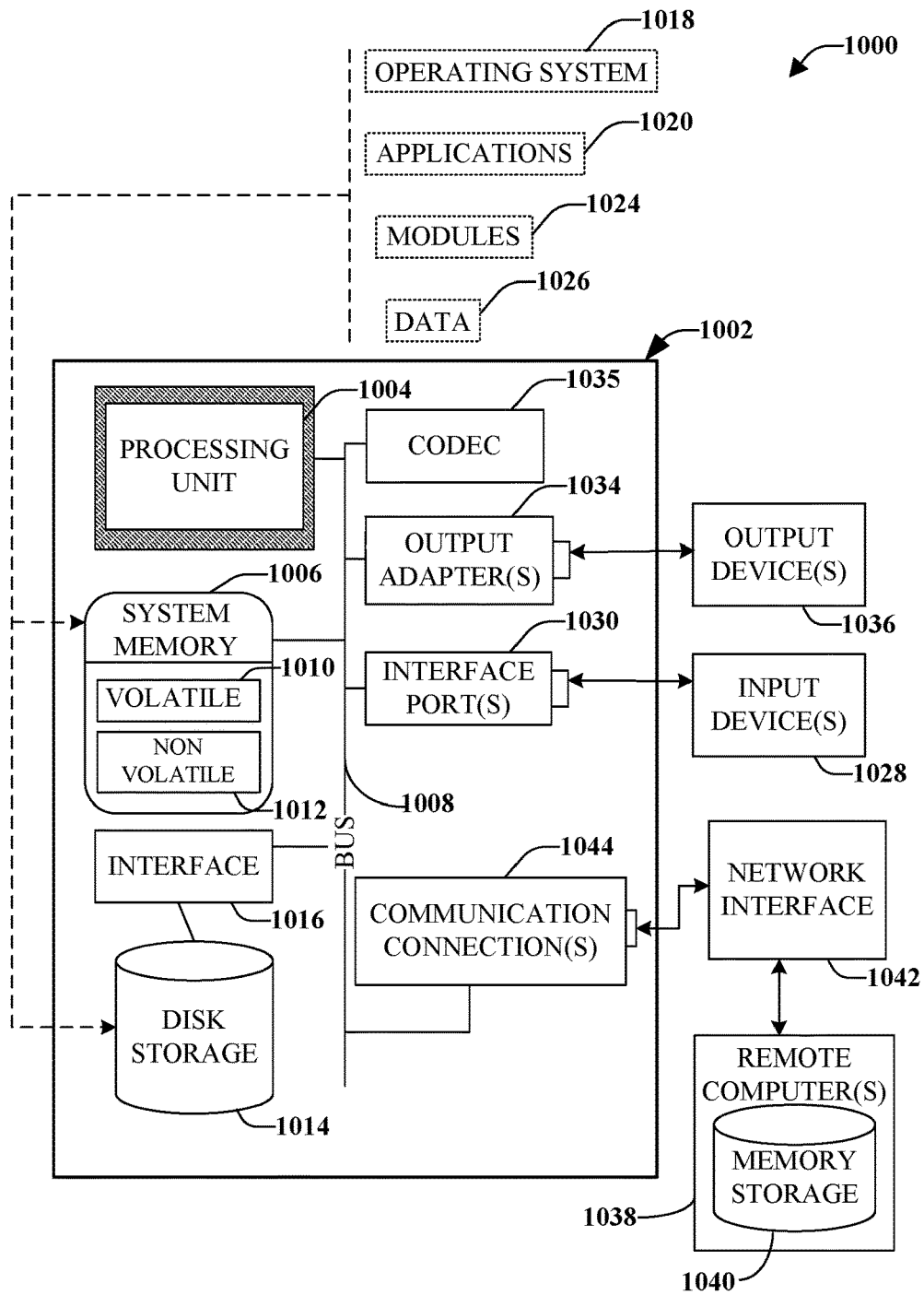
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
a feature mapping component that generates feature vector data representing attributes of a set of warnings, wherein the set of warnings is generated in response to a static program analysis of computer program data, and the attributes comprise respective types of conditional statements included in a program flow of the computer program data associated with a warning of the set of warnings; and
a statistical learning component that:
receives policy data representing a weighting policy associated with a warning filter, wherein the weighting policy assigns identification of a false negative to a first value, identification of a true positive to a second value, and identification of the false positive to a third value, wherein the first value is a assigned a highest value as between the first value, the second value and the third value, wherein the second value is assigned a next highest value and wherein the third value is assigned a lowest value as between the first value, the second value and the third value;
selects a candidate warning filter with a highest score between the first value, the second value and the third value; and
determines a warning filter as the candidate warning filter with the highest score, wherein the warning filter is employed to filter portions of the set of warnings.

2. The system of claim 1, wherein the attributes further comprise a count of the conditional statements included in the program flow of the computer program data associated with the warning.

3. The system of claim 1, wherein the weighting policy is indicative of a weighting of importance between reduction of false positives and identification of true positives.

4. The system of claim 1, wherein the statistical learning component further generates filtered output in response to applying the warning filter to the set of warnings.

5. The system of claim 1, wherein the statistical learning component further generates a set of candidate warning filters that differ based on respective classification algorithms that are trained according to a machine-learning technique, and wherein the set of candidate warning filters comprises the warning filter.

6. A computer program product for filtering security warnings, the computer program product comprising a computer readable storage medium having program instructions embodied therewith, the program instructions executable by a processor to cause the processor to:
generate, by the processor, feature vector data for a set of warnings, wherein the set of warnings is generated by a static program analysis component that performs static analysis of a computer program, and wherein the feature vector data indicative of attributes of the set of warnings, and the attributes comprise respective types of conditional statements included in a program flow of the computer program data associated with a warning of the set of warnings;
determine, by the processor, policy data representing a weighting policy associated with a warning filter;
based on the policy data, assign, by the processor, identification of a false negative to a first value, identification of a true positive to a second value, and identification of the false positive to a third value, wherein the first value is assigned a highest value as between the first value, the second value and the third value, wherein the second value is assigned a next highest value and wherein the third value is assigned a lowest value as between the first value, the second value and the third value;
select, by the processor, a candidate warning filter with a highest score between the first value, the second value and the third value; and
determine, by the processor, a warning filter as the candidate warning filter with the highest score, wherein the warning filter is employed to filter portions of the set of warnings.

7. The computer program product of claim 6, wherein the program instructions are further executable by the processor to cause the processor to generate, by the processor, filtered output in response to application of the warning filter to the set of warnings, wherein the filtered output comprises the first subset.

8. A computer-implemented method, comprising:
determining, by a device operatively coupled to a processor, feature vector data for a set of warnings, wherein the set of warnings is generated in response to static analysis of a computer program, and wherein the feature vector data is indicative of attributes of the set of warnings, and the attributes comprise respective types of conditional statements included in a program flow of the computer program data associated with a warning of the set of warnings; and
determining, by the device, policy data representing a weighting policy associated with a warning filter;
based on the policy data, assigning, by the device, identification of a false negative to a first value, identification of a true positive to a second value, and identification of the false positive to a third value, wherein the first value is assigned a highest value as between the first value, the second value and the third value, wherein the second value is assigned a next highest value and wherein the third value is assigned a lowest value as between the first value, the second value and the third value;
selecting, by the device, a candidate warning filter with a highest score between the first value, the second value and the third value; and
determining, by the device, a warning filter as the candidate warning filter with the highest score, wherein the warning filter is employed to filter portions of the set of warnings.

9. The computer-implemented method of claim 8, further comprising utilizing, by the device, the warning filter to filter the set of warnings.

10. The computer-implemented method of claim 8, further comprising determining, by the device, a set of candidate warning filters that differ based on respective classification algorithms that are trained according to a machine-learning technique, and wherein the set of candidate warning filters comprises the warning filter.

* * * * *